United States Patent [19]
Davis et al.

[11] Patent Number: 4,857,159
[45] Date of Patent: Aug. 15, 1989

[54] ELECTRODEPOSITION RECOVERY METHOD FOR METALS IN POLYMER CHELATES

[75] Inventors: James C. Davis, Hudson; Michael F. McGuiggan; Edward A. Cuellar, both of Shaker Heights; Frederick W. Haas, University Heights, all of Ohio

[73] Assignee: The Standard Oil Company, Cleveland, Ohio

[21] Appl. No.: 30,209

[22] Filed: Mar. 25, 1987

[51] Int. Cl.$^4$ ............ C02F 1/46; C25B 1/12; C25B 1/20

[52] U.S. Cl. ............ 204/149; 204/182.4; 210/748; 75/101 BE; 75/121

[58] Field of Search ............ 204/52.1, 149, 182.4; 210/748

[56] References Cited

U.S. PATENT DOCUMENTS

| | | | |
|---|---|---|---|
| 3,864,222 | 2/1975 | Wilson et al. | 204/43 |
| 3,869,358 | 3/1975 | Nobel et al. | 204/55 |
| 3,928,149 | 12/1975 | Steeg | 204/55 |
| 3,993,548 | 11/1976 | Cruetz et al. | 204/55 |
| 4,039,404 | 8/1977 | Richards et al. | 204/106 |
| 4,176,017 | 11/1979 | Martin | 204/55 |
| 4,396,471 | 8/1983 | Fletcher et al. | 204/43 |
| 4,401,526 | 8/1983 | Martin | 204/43 |
| 4,425,198 | 1/1984 | Martin | 204/43 |
| 4,443,305 | 4/1984 | Haynes | 204/109 |
| 4,543,169 | 9/1985 | D'Agostino et al. | 204/109 |
| 4,555,315 | 11/1985 | Barbieri et al. | 204/52.1 |

*Primary Examiner*—John F. Niebling
*Assistant Examiner*—David G. Ryser
*Attorney, Agent, or Firm*—Larry W. Evans; Joseph G. Curatolo; Sue E. Phillips

[57] ABSTRACT

The process of the present invention for the recovery of metal ions from a polymeric chelating agent stream or solution comprises the circulation of a loaded polymeric chelating agent stream or solution through an electrolytic recovery cell. The chelating agent is loaded with metal ions or complexes of the species to be recovered which have been extracted from a feed stream or solution. These metal ions or complexes will be reduced and recovered from the chelating polymer by an electrodeposition method. If the chelating agent is used in a continuous flow-type system, the lean polymeric chelating agent can optionally be recycled for further use in extraction of the desired metal species. The addition of scrub and regeneration stages to such a system is optional, depending on feed stream composition.

22 Claims, 2 Drawing Sheets

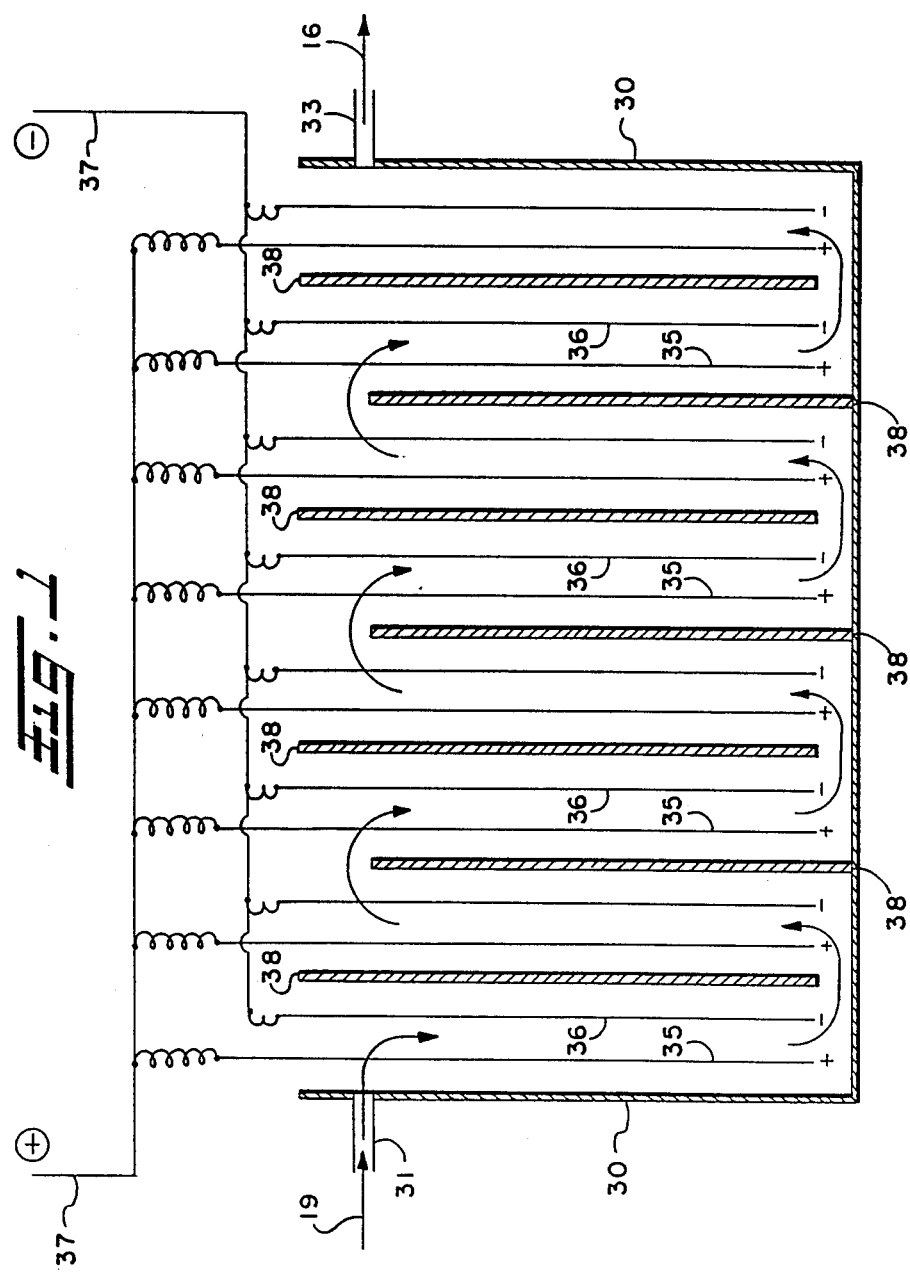

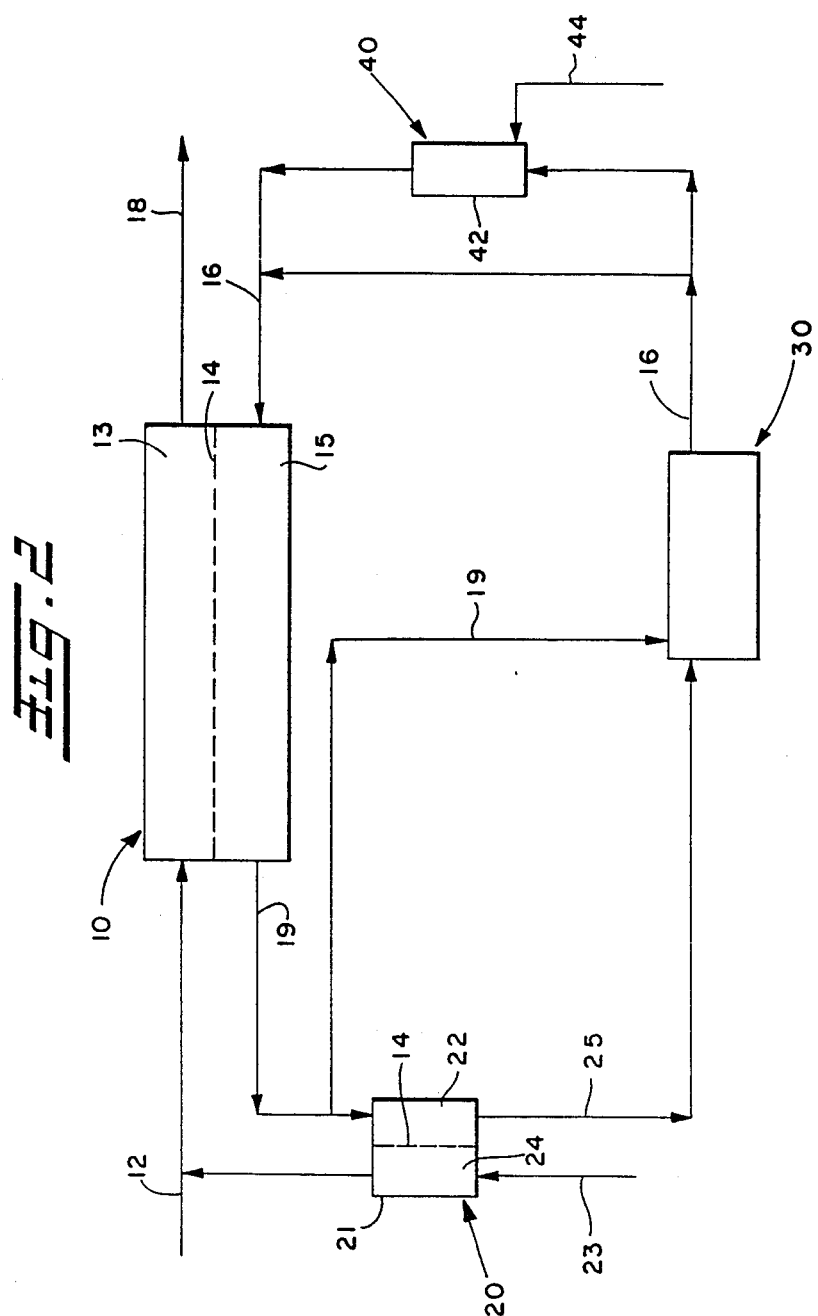

ELECTRODEPOSITION RECOVERY METHOD FOR METALS IN POLYMER CHELATES

FIELD OF THE INVENTION

This disclosure is a continuation-in-part of U.S. patent application Ser. No. 862,880 filed May 13, 1986. The subject invention is directed toward a unique process which employs an electrolytic recovery cell for the direct recovery of a desired metal species from a polymeric chelating agent solution. Generally, any flow stream which contains a desirable metal ion or a contaminant metal ion for which a known adsorbent exists can be treated with this process for separation and removal. Applications for this process include the direct recovery of metals from streams such as plating wastes, photographic processes, and liquors from mining operations.

BACKGROUND OF THE INVENTION

Electroplating is the electrodeposition of a metallic coating on an electrode in order to form a surface with properties or dimensions different from those of the electrode material. The properties which may be conferred by electroplating include improved corrosion resistance, enhanced appearance, frictional characteristics, wear resistance and hardness, solderability, and specific electrical properties.

The thickness of the deposit formed by electroplating varies with the application. Where the deposit is applied for decorative purposes as little as 0.025 micrometers may be applied. Conversely, nickel-chromium deposits on automotive hardware might be as thick as 25–50 micrometers, and 1 millimeter deposits may be laid down on electroforms. Electrowinning, an electroplating technique in which the metal ions are removed in bulk amounts, may deposit as thick as two inches.

Generally, electrodeposition and electroplating have been used as surface treatment. Deposition and plating solutions are usually aqueous. Known exceptions to the use of aqueous solutions include plating of aluminum, which may be plated from organic electrolytes, and plating of tungsten, molybdenum, tantalum, aluminum, and niobium, which may be plated from fused electrolytes. The solutions usually contain additives to perform any one of several different functions such as providing a source of ions for the metal species to be deposited; providing conductivity; stabilizing the solution; buffering the pH of the solution; and aiding and modifying other properties particular to the involved solution. Many viable compounds accomplish more than one of the above functions.

Polymeric chelating agents, conventionally used to enhance physical characteristics of the metal being deposited, are examples of solution additive. The art is replete with patents documenting the use of polymeric additives for the purpose of brightening a plated metal species. This task was previously accomplished by post-plating methods, such as buffing, but more recently is being achieved during the plating process by addition of polymeric chelating agents. The brightening agents used are most often organic compounds and are added in small amounts, usually less than about one percent of the electroplating solution or bath.

U.S. Pat. No. 3,864,222 discloses the incorporation of polyethylene imines into gold and gold alloy plating baths as agents for the general improvement of brightness of the electroplate and of other physical properties of the deposit obtained, as well as the operating conditions of the bath.

U.S. Pat. No. 4,425,198 discloses the use of a polyacrylamide polymer as a brightener in a zinc alloy electroplating bath. Acrylamide was also used as a primary brightener for a zinc electroplating bath in U.S. Pat. No. 4,176,017.

Other brightening agents known in the art are used commonly in zinc and zinc alloy plating baths, examples of which include beta-amino-propionic acid, disclosed in U.S. Pat. Nos. 4,401,526; quarternary ammonium silicates, disclosed in 3,993,548; polypropoxy and polypropoxy-ethoxy, claimed in 3,928,149; and epihalohydrin-alkylene amine polycondensates, used in 3,869,358.

U.S. Pat. No. 4,396,647 discloses the use of a cobalt, nickel, or indium hardener as a chelate with the acid form of a methyl vinyl ether/maleic anhydride interpolymer for gold cyanide electroplating baths.

In each of the above cited patents, and in the known art, polymers of the types mentioned function as brightening agents, or agents which impart ductility, hardness, and other physical characteristics to a plated metal coating. It is noted here that in each instance, the metal plated was plated for the purpose of surface coating an existing material to enhance specific characteristics.

Electrowinning is an electrodeposition technique for extracting bulk amounts of a metal from its ore in an electrolytic cell. Hydrometallurgical processes have been used for electrowinning for the recovery of zinc, cobalt, chromium, manganese, nickel, cadmium, gallium, thalium, indium, silver, gold, and copper. The process involves subjecting the metal salt in solution to electrolysis and electrodepositing the metal at the cathode.

Direct electroplating has been used as a recovery method of sorts to remove objectionable pollutants from electroplate feed streams or solutions, as pollution is a prevalent proble with electroplating processes. In the past, the problem was solved by destruction of the objectionable metal species. The metals were precipitated as sludges and disposed of in landfills. Metal cyanides, which are among the most dangerous of chemical pollutants, are most often dealt with by destruction methods such as chlorination, electrolysis, solvent extraction and catalytic methods. Emphasis has shifted, however, to the direct recovery of objectionable metals for reuse in the plant or for resale to refiners. Proposed recovery methods for metals less dangerous than cyanides include reverse osmosis, evaporative recovery, ion exchange, and combinations thereof. High cost of equipment, among other costs particular to specific methods, such as membrane replacement in reverse osmosis, make such methods prohibitive in many instances.

A specific instance where the recovery of desirable metal species may be important is in affinity dialysis and other similar soluble affinity adsorbent systems. The conventional means for removal of metal species from the feed solution of such systems is to bind the metal species to an affinity adsorbent in an extraction step and then strip the metal from the soluble adsorbent at a later stage of the process. This requires use of a strip reagent, which destroys the binding complex and releases the metal species to be stripped. The strip reagent comprises an aqueous solution of an acid or base, depending on the charge character of the material to be stripped. Where the system is a continuous flow system, this addition of reagent may then further necessitate regeneration, or adjustment of the pH, of the affinity adsorbent by further addition of acid or base solution prior to its recirculation through the system. Such processes require costly chemicals, extensive pumping equipment, and highly sensitive controls for monitoring of system parameters such as temperature, pH, and feed flow to affinity adsorbent flow ratio.

What is lacking in the art is a means for efficient recovery or removal of metals in substantially pure bulk form from feed solutions containing a polymeric chelating agent which has adsorbed the metal species. Also lacking is a bulk metal ion recovery or removal process applicable in either single pass or continuous flow systems.

Therefore, it is an object of the present invention to provide a feasible method for the recovery of desirable metals as well as the removal of objectionable metals from solutions.

It is also an object of the present invention to provide a method for the recovery of desired metal species in a substantially pure form from a polymeric chelating solution.

It is a further object of the present invention to provide a method for the recovery of metal species from affinity adsorbent systems in an efficient and simple manner.

These and additional objects of the present invention will become apparent in the description of the invention and examples that follow.

SUMMARY OF THE INVENTION

The present invention relates to a process for the recovery of at least one metal species from a polymeric chelating agent stream comprising the steps of:
  circulating the polymeric chelating agent stream through an electrolytic recovery cell, the polymeric chelating agent being loaded with metal ion or complexes of the species to be recovered;
  reducing the metal ions or complexes from the polymeric chelating agent by application of voltage and current through the stream of loaded polymeric chelating agent; and
  depositing the metal species from the stream at the cathode of said electrolytic recovery cell.

The invention also relates more specifically to a process for the recovery of metal species from an affinity adsorbent/polymeric chelating agent stream of an affinity dialysis system wherein the lean polymeric chelating agent is recycled to the extraction stage of the affinity dialysis system. The addition of scrub and regeneration stages to such a system is optional, depending on feed stream composition.

DETAILED DESCRIPTION OF THE INVENTION

In accordance with this invention, metal ions or metal complexes adsorbed by a polymeric chelating agent are recovered by direct electrodeposition.

Direct electrodeposition of metal ions or complexes is accomplished in an electrolytic recovery cell. The cell consists of an anode and a cathode disposed in a cell housing. The electrolyte of the cell enters from one side of the cell, flows across both electrodes of the cell, and exits the cell on another side thereof. A potential is applied across the cell, supplied by an exterior power source, which causes the reduction of the desired metal species and deposition thereof at the cathode.

The cathode of the electrolytic recovery cell is a material suitable for the deposition of the metal ion or complex of interest, and may be in the form of a plate electrode, rotating electrode, or other suitable form. Some suitable cathode materials include copper, nickel, stainless steel and others known to those skilled in the art. Suitable anodes may include DSA, lead-calcium alloy anodes and other conventional anode material known in the art such as carbon felt, granular carbon, graphite, and stainless steel.

The electrolyte of the cell is the polymeric chelating agent solution or stream, which may or may not contain quantities of other components which are not the metal species of interest in the instant electrodeposition process. The electrolyte solution comprises the bound polymer, the metal ions or complexes to be reduced and deposited or plated out, and these other components. The polymeric chelating agent of the present invention may be any of a wide variety of adsorbent materials. The agent may be soluble, suspended in or otherwise carried along by the solution or stream as a stable suspension of microparticles used to circulate the polymer. The polymer is selected for its preferred affinity to chelate or otherwise combine with the material or materials to be separated from other material or materials in a liquid feed stream, i.e. it must demonstrate a selectivity for at least one metal species over other metal species present in the feed stream or solution. The polymer chosen must also be susceptible to being stripped of the desired metal species by a direct electrodeposition method. It may affect and bind the metal ion or complex such that it concentrates or enriches the desired species.

Representative adsorbent materials operative in the subject invention include most chelating and ion exchange polymers. Exemplary polymers include sulfonated polyolefins, polyacrylic acid based compounds, polyethylenimine of a weight average molecular weight of about 2,000 or greater, hydroxyethylated polyethylenimine of a weight average molecular weight of about 2,000 or greater, polyimino acetic acid, polyimino diacetic acid, polythiourea, poly(2-acrylamide-2-methyl-1-propanesulfonic acid), poly(1,1-dimethyl-3,5-dimethylene-piperidinium chloride), water soluble polymers with Schiff base chelates attached, water soluble polymers with hydroxy quinolines attached, and other chelating polymers known in the art and envisioned based on known chelation behavior and known polymer backbones.

The chelating agent is carried by a solvent which is either water or an aqueous media, for example water and alcohols or other water miscible organic solvents. The chelating agent is generally dissolved in the solvent to a maximum concentration, which concentration will vary as the chelating agent and solvent vary, as well as with practical limitations due to viscosity.

The polymeric chelating agent solution has a polymer concentration of about 0.5 weight percent to about 25 weight percent, more preferably of about 10 weight percent to about 15 weight percent, wherein the term "weight percent" refers to the number of grams of polymer per one hundred grams of solution. Polymer concentrations lower than about 0.5 weight percent deposit or plate substantially lesser amounts of metal, requiring that the electrolytic cell capacity be considerably increased in order for a significant amount of metal to be recovered, which causes a corresponding decrease in current efficiency, and may require that higher value metals be reduced and deposited or plated to justify reduced efficiency. The effect of lower concentrations on adsorbent systems similar to affinity dialysis systems would be to decrease the efficiency of the extraction process. Polymer concentrations much higher than 25 weight percent result in a solution of extremely high viscosity in which the polymeric chelating agent is not efficiently utilized.

The polymeric chelating agent solution or stream may contain interfering or non-interfering metal ions or complexes. Where the purpose of the system is to recover a substantially pure metal deposit or plate, interfering metal ion species, which reduce and are released or plate in the same or a similar potential range as the desired species, must be removed. The desired metal species may be deposited or may plate in a dendritic manner, leaving voids which may be occupied by interfering species unless the interfering species is removed prior to deposition or plating. However, contaminating or interfering ions may be removed from the solution or stream prior to the electrodeposition process by passing the solution or stream through a scrub stage. Where the interfering ion or complex is bound to the polymeric chelating agent, the scrub stage normally encompasses the passage of the stream or solution carrying the desired metal species and the contaminant through a basic or acidic reagent stage, such reagent having an affinity for the interfering species. This causes release of the interfering species, leaving only the desired species intact. Alternatively, a water stream may be used in the scrub stage to remove contaminants not bound to the polymer.

Non-interfering metal ions are those ions which are picked up by the polymeric chelating agent stream or solution, from the feed stream, which do not demonstrate an affinity for the potential applied across the cell and consequently are not released, but rather remain in the stream. In a continuous flow system, a steady state concentration of non-interfering metal ions and complexes will be achieved. This results from the recirculation of the polymer stream or solution, which has adsorbed the ions. During recirculation the ions migrate back and forth across a separating membrane or between the feed stream and the polymer stream until the concentration of noninterfering ions reaches an equilibrium state between the solution from which the ions or complexes originate and the polymeric chelating agent stream or solution. These noninterfering ions and/or complexes will not be plated out due to the affinity of certain ions and complexes to plate out more readily at certain specific voltages.

The potential applied across the cell is related to the metal species being deposited or plated. The deposition of metal species follows what is effectively a hierarchy of deposition order, wherein different metal species reduce at different ranges of electrical potential. Thus, at a given potential, some species deposit or plate more readily than others. Consequently, controlling the applied electrical potential is one means of controlling the deposition or plating process with respect to choice of metal species recovered. The current density of a typical electrolytic recovery cell for the recovery of metals ranges from about 1 amp/ft$^2$ to about 300 amp/ft$^2$, preferably about 5 to about 100 amp/ft$^2$.

When the electrolytic cell is operated at appropriate voltage and current density, the circulation of the polymeric chelating agent solution or stream through the cell results in the reduction of the metal ion species. Once reduced, the metal ions will deposit or plate at the cathode of the electrolytic recovery cell.

The pH of the polymeric chelating stream or solution, which may range from greater than 0 to 14, should be maintained within a range sufficient to bind the desired metal ion species. Acid is generated in the stream or solution by the deposition or plating process and may, therefore, depending on the amount generated and the operating pH of the stream, require balancing or neutralization of the stream for maintenance of the optimal pH. When the metal species to be recovered is a metal cation, the pH preferably ranges from greater than 0 to about 5. When the metal species to be recovered is in the complexed form, it is usually an anion with a pH preferably ranging from about 9 to about 12.

The temperature and pressure at which the electrodeposition process is conducted is dictated by the materials and conditions of the electrodeposition bath. These parameters can be selected to be consistent with practices conventional in the art and compatible with the instant process materials. The bath temperature is determined by the individual bath, as each bath solution is characterized by a range of temperatures within which best results may be achieved. Temperature affects such parameters as conductivity, current efficiency, nature of deposit and stability. The pressure may generally be ambient, however, in some instances, recognizable by those skilled in the art, pressure control by conventional methods may be necessary.

Substantially any metal species that can be chelated and electrodeposited, anionic or cationic, can be recovered by the method of the subject invention. More particularly, substantially any type of anion, such as chromates, stannate, and zinc, silver or gold cyanide complexes can be recovered through direct electrodeposition; cations which are similarly recoverable include transition metal ions, such as copper, nickel or zinc, metals in photographic processes, and metals recoverable from the liquor of mining operations. Where the metal species to be recovered is complexed, the complex is destroyed in order to release the metal component which can then be recovered. Exemplary metal ion and complex species which may be recovered include Cr, $CrO_4^{2-}$, Mn, Fe, Rh, Ir, Bi, Sb, Re, Tc, In, Tl, Ga, Te, Po, Co, Ni, Cu, Zn, Zr, Ru, Pt, Pd, Ag, Cd, Sn, Hg, Pb, $[Zn(CN)_4]^{2-}$, $[Ni(CN)_5]^{3-}$, $Na_2Sn(OH)_6$ and $K_2Sn(OH)_6$. Preferred metal species are Cu, Cr, Ni, Zn, Ag, Cd, Sn, Pb, Pd, Pt, Ru, Ir, Zr, $CrO_4^{2-}$, $[Zn(CN)_4]^{2-}$, $[Ni(CN)_5]^{3-}$, $Na_2Sn(OH)_6$ and $K_2Sn(CH)_6$. Most preferred metal species are Cu, Zn, Sn, Ni, $CrO_4^{2-}$, and Ag. alloy materials such as Cu/Zn, Cu/Sn, Pb/Sn, Sn/Ni, Ni/Co, and Ni/Cr, may also be deposited or plated by the process disclosed herein.

BRIEF DESCRIPTION OF THE DRAWINGS

FIG. 1 is a diagramatic view of an electrolytic recovery cell for the direct removal of metal ions from a loaded polymeric chelating agent stream; and FIG. 2 is a schematic diagram of an affinity adsorbent system, as in the preferred embodiment of the present invention, including separate processes for extraction, scrubbing, and regeneration which may or may not accompany the electrolytic recovery cell of the subject invention.

DETAILED DESCRIPTION OF THE DRAWINGS

FIG. 1 depicts an electrolytic recovery cell encompassed by the disclosure of the subject invention. The loaded polymeric chelating agent stream or solution 19 enters the electrolytic recovery cell 30 at an inlet port 31, flows through the cell, and exits the cell at outlet port 33 as a lean polymeric chelating agent stream or solution 16. While within the electrolytic recovery cell, polymeric chelating agent stream 19 flows over the cell's anode 35 and cathode 36. A potential applied across the anode 35 and cathode 36 from a remote power supply 37 causes reduction of the desired metal species, which subsequently deposits at the cathode 36 of the cell assembly. Multiple cell assemblies may be connected in sequence, separated by a series of baffles 38 to help direct electrolyte flow, to increase recovery efficiency per pass of loaded polymeric chelating agent. Conversely, a singular cell assembly may be employed. The metal species recovered may be removed from the cell by removal of the electrodes, mechanical stripping thereof and replacing the electrodes, or other methods known in the art, i.e., where the deposited or plated material forms directly on the electrode, but is precipitated immediately by turbulence, release agent or vibration.

Once deposition or plating has taken place, the lean polymeric chelating agent solution or stream can be recirculated for further use. Depending on the ratio of feed flow volume to polymer flow volume, a regeneration stage may be necessary. When the ratio is high, the acid that is generated during the electrodeposition process will diffuse out of the polymer flow and into the feed flow without substantially changing the pH, therefore, no regeneration process is necessary. At lower ratios, however, the presence of the acid in the polymer stream may shift the pH of the stream making the polymer unable to bind the metal species. When the pH range is more basic, an acidic reagent solution may be added to the stream to enable binding of the metal species.

The preferred embodiment of the subject application is depicted in FIG. 2 which is a schematic diagram of a continuous flow affinity dialysis system. Such a system is disclosed in pending applications U.S. Ser. Nos. 742,872 and 802,836. These applications disclose a process for selective dialysis using polymeric affinity adsorbents and size selective membranes, and a scrubbing unit for high feed concentrations to be used in the affinity dialysis process, respectively.

U.S. Ser. No. 742,872 provides for the use of a porous membrane with pores of a sufficient dimension to allow the passage of different materials therethrough. An affinity adsorbent stream, comparable to the polymeric chelating agent stream of the subject invention, is circulated against a first side of this membrane, the dimension of the adsorbent being larger than the pores of the membrane. A feed stream containing materials to be adsorbed is passed against the second side of the membrane. The materials to be adsorbed, being of smaller dimension than the membrane pores, pass through the membrane from the second feed stream side to the first-affinity adsorbent stream side where they are adsorbed onto the affinity adsorbent.

The loaded polymeric chelating agent stream then passes from the extraction stage to an optional scrub stage, which is described in detail in U.S. Ser. No. 802,836, where any interfering or objectionable adsorbed species can be removed.

The polymeric chelating agent stream then, according to U.S. Ser. No. 742,872, must pass through a stripper unit in order for the species adsorbed by the polymeric chelating agent to be released and possibly recovered. This often requires the addition of a stripping reagent, which in turn generates a need for a regeneration unit wherein a second reagent solution is added to rebalance the system before recirculation to the extraction stage. Thus, an acid/base cycle is undergone.

The electrolytic recovery cell of the present invention may be substituted into the affinity dialysis system of either of the two cited U.S. patent applications to replace the strip stage when the species to be recovered is a metal ion or metal complex. The incorporation of an electrolytic recovery cell into an affinity dialysis system will negate the need for the acid/base cycle referred to above in conjunction with stripping/regenerating the affinity adsorbent stream. As there will no longer be a need for the addition of a stripping reagent, there will also no longer be a need for the concomitant addition of a second reagent to neutralize or rebalance the system. An optional regeneration stage may still be necessary with the electrolytic recovery cell depending on the amount of acid generated in the cell during destruction of the metal species-chelating agent complex and metal ion reduction at the cell electrode.

The replacement of the stripper/regeneration portions of prior known affinity dialysis systems with the electrolytic recovery cell of the subject invention will reduce equipment use and needs, and simplify system operation and maintenance due to the lack of strip reagent addition, and elimination of the membrane strip stage.

The preferred embodiment of the subject application is depicted in FIG. 2 comprising an extraction unit 10, optionally followed by a scrubbing unit 20, an electrolytic recovery cell 30, and an optional regeneration unit 40.

In the affinity dialysis system of the preferred embodiment, the extraction unit 10 comprises an apparatus for continuous counter current mode work, operative for long-term, steady-state work. The apparatus includes a membrane unit of stainless steel or other suitable material within which are enclosed semipermeable membranes. A feed 12 of different materials, including the metal species to be recovered, is circulated against one side 13 of the membrane 14. A supply of polymeric chelating agent 16, either fresh or regenerated, is circulated against a second side 15 of the membrane 14 in a countercurrent mode to feed stream 12. The membrane 14 has a pore diameter of sufficient size to allow migration of metal ions through the membrane pores. These metal ions are then complexed by the polymeric chelating agent 16 which is flowing in a counter current mode on the second side 15 of the membrane 14. The depleted feed 18 exits the extraction unit to be discarded and the loaded polymeric chelating agent 19 is circulated to electrolytic recovery cell 30.

Electrolytic recovery cell 30 consists of a cathode and anode assembly, suitable for recovery of the desired metal species, and a power source supplying potential across the cell appropriate for reduction of the metal ions that are to be recovered. The specific assembly of the cell is more completely illustrated in FIG. 1, described in detail above.

The loaded polymeric chelating agent stream 19 is circulated through electrolytic recovery cell 30, acting as the electrolyte therein. The potential across the cell, supplied by a remote power source (not shown) causes the loaded polymeric chelating agent to release the metal ions complexed thereon. These metal ions are deposited at the cathode as is described above in conjunction with the explanation of FIG. 1. The deposited metal product is removed from the cell, and the lean polymeric chelating agent 16, devoid of metal ions of the desired species is circulated out of electrolytic recovery cell 30 and back to extraction unit 10 for reuse.

An optional regeneration unit 40 may be used to return the polymeric chelating agent to a pH amenable to complexing of the desired metal species. The regeneration unit comprises a vessel 42 to which a regenerant stream 44 is fed. The regenerant added will be a base where the acid produced during electrodeposition of the metal ions in electrolytic recovery cell 30 has caused a significant shift in the pH of polymeric chelating agent stream 16. Conversely, if polymeric chelating stream 16 is more basic, the regenerant added will be an acid. The necessity of adding regeneration unit 40 to the system will most often be determined, however, by the feed flow volume to polymer flow volume, as was previously explained.

As a further optional step, either to the dialysis process conducted in unit 10 with the electrolytic recovery cell, unit 30, or where electrolytic recovery is conducted as a separate process, the scrubbing unit 20 can be employed. The scrubbing unit 20 can comprise a cell or hollow fiber unit 21 not unlike that of extraction unit 10 referenced hereinabove. The cell 21 also employs a membrane 14 that can be the same or a different membrane as employed in the other cells. The purpose of the scrubbing stage is to remove metal ion species or other species which would interfere with the recovery of the desired metal species in the electrolytic recovery cell.

In operation, the loaded polymeric chelating agent stream 19 is fed to a first side 22 of the membrane 14 and a stream of water or basic or acidic reagent 23 is fed to the second side 24. The purpose of the water feed is to remove any extraneous material that is first soluble and second not complexed with the adsorbent. The basic or acidic reagent is chosen to remove interfering material complexed by the polymeric chelating agent. The effluent complex stream 25, once devoid of extraneous materials, can be fed directly to electrolytic recovery cell 30.

EXAMPLES

In order to further illustrate the present invention, the following examples are provided, which examples are not intended to be limitative of the invention disclosed herein.

The examples, examples 1-6, results of which are shown in Table I, were conducted according to the procedure set forth herein below.

Typically, 100 to 200 milliliters of polymeric chelating agent solution was placed into a beaker or other suitable container. An anode was submerged in the solution at one side of the beaker or container, and a cathode was submerged on the opposite side in a substantially parallel position. Agitation was provided by the use of a teflon coated magnetic stirrer. All experiments were conducted at ambient temperature, except example 6 which was done at 65° C. For deposition or plating at elevated temperature, a hot plate/stirrer was used. A suitable DC power supply was attached to the electrodes and an appropriate amperage and field applied. Deposition or plating was continued until the chelate solutions appeared to be free of metal or until several hours had elapsed and a solid bulk of the desired metal was apparent at the electrode. Metal recovery was determined by the weight increase after air drying of the electrode.

The results and operating parameters of examples 1-6 are presented in the following table, Table I.

TABLE I

| Example | Wt/Vol %, Polymer in Plating Solution | Feed Solution PPM Metal | pH | Cathode[c] | Current Density amps/ft$^2$ | Metal Plated | % Metal Recovery |
|---|---|---|---|---|---|---|---|
| 1 | 5% POLYMIN-P[a] | 12,750 Cu(II) 18.625 Ca(II) 8,000 Zn(II) | 4 | Copper | 10 | 7,700 ppm Cu (1.95 g) | 60% |
| 2 | 10% POLYMIN-P[a] | 15,000 Cu(II) 50,000 Ca(II) 20,000 Zn(II) | 4 | Copper | 10 | 9,500 ppm Cu (2.4 g) | 63% |
| 3 | 5% hydroxyethylated polyethylenimine | 15,000 Cu(II) | 3.2 | Ni 200 | 20 | 15,000 ppm Cu (1.8 g) | 100% |
| 4 | 2.5% AAMPS[b] | 5,000 Cu(II) | 3.0 | Ni 200 | 40 | 5,000 ppm Cu (0.64 g) | 100% |
| 5 | 6% Polystyrene sulfonic acid | 10,000 Cu(II) | 3.0 | Ni 200 | 40 | 10,000 ppm Cu (1.062 g) | 100% |
| 6 | 10% poly(1,1 dimethyl-3,5-dimethylene-piperidinium chloride) | 33,000 Sn as $Na_2Sn(OH)_6$ | 13.5 | Copper | 288 | 8,000 ppm Sn (0.83 g) | 24% |

[a]trademark of BASF
[b]poly(2-acrylamide-2-methyl-1-propanesulfonic acid)
[c]all used carbon anodes, except Example 6 which used platinum wire Table I shows the metal recovery values for each of examples 1-6, and relates the selectivity of the particular polymeric chelating agent employed for the metal plated.

Examples 1 and 2 show the selectivity of the polymeric chelating agent for one metal species over another. In example 1, the polymeric chelating agent stream was a 5% concentration by weight/volume of POLYMIN-P. This was increased to a 10% concentration by weight/volume of POLYMIN-P in example 2. The feed solution in both examples contained Cu(II), Ca(II) and Zn(II). Both examples show a recovery of 60% or better of copper, the desired metal species. This demonstrates the selective chelation of the desired metal species by the polymeric chelating agent in the presence of other metal species with good recovery percentage.

Examples 3-5 each illustrate recovery of the desired metal from a feed stream which does not contain substantial amounts of other metal species. The percent recovery in each instance was 100%, illustrating the utility of the recovery technique in situations such as the clean up of a loaded waste or product stream. Examples 3-5 used different polymeric chelating agents, at varying concentrations, exemplifying the need to coordinate the concentration of a particular polymeric chelating agent stream with the metal to be recovered and the amount of metal in the stream, as well as with the binding power of the agent.

Example 6 is illustrative of the recovery of a metal species from an anionic complex thereof. The pH of the system was 13.5, corresponding to the basicity of the anionic complex. Recovery percentage was somewhat less than in previous examples 1-5 due to shorter exposure time to the applicable electric field, however, the plate was essentially pure for tin.

While the invention has been explained in relation to a preferred embodiment and several examples, it is to be understood that various modifications thereof will become apparent to those skilled in the art upon reading the Specification. Therefore, it is to be understood that the invention disclosed herein is intended to cover such modifications as fall within the scope of the appended claims.

What we claim is:

1. A process for the recovery of at least one metal species from the polymeric chelating agent stream comprising the steps of:
    circulating said polymeric chelating agent stream through the electrolytic recovery cell, said polymeric chelating agent being loaded with metal ions or complexes of said species to be recovered, said species selected from the group consisting of Cr, $CrO_4^{2-}$, Pb, Ir, Ni, Cu, Zr, Ru, Pt, Pd, Ag, Cd, Sn, $[Ni(CN)_5]^{3-}$, $Na_2Sn(OH)_6$, and $K_2Sn(OH)_6$;
    reducing said metal ions or complexes from said polymeric chelating agent by application of voltage and current through said stream of loaded polymeric chelating; and
    depositing said metal species from said stream at the cathode of said electrolytic recovery cell such that a bulk amount of said species is recovered.

2. The process as set forth in claim 1 wherein said polymeric chelating agent is characterized by a selectivity for said at least one metal species over at least one other metal species.

3. The process as set forth in claim 2 wherein said polymeric chelating agent is selected from the group consisting of sulfonated polyolefins, polyacrylic acid based compounds, polyethylenimine, hydroxyethylated polyethylenimine, polyimino acetic acid, polyimino diacetic acid, polythiourea, poly(2-acrylamide-2-methyl-1-propanesulfonic acid), poly(1,1-dimethyl-3,5-dimethylene-piperidinium chloride), water soluble polymers with Schiff based chelates attached, and water soluble polymers with hydroxy quinolines attached.

4. The process as set forth in claim 3 wherein said polymeric chelating agent is a polyethylenimine having a weight average molecular weight of about 2,000 or greater.

5. The process as set forth in claim 3 wherein said polymeric chelating agent is a hydroxyethylated polyethylenimine having a weight average molecular weight of about 2,000 or greater.

6. The process as set forth in claim 1 wherein said polymeric chelating agent stream has a polymer concentration of about 0.5 weight percent to about 25 weight percent.

7. The process as set forth in claim 6 wherein said polymeric chelating agent stream has a polymer concentration of about 10 weight percent to about 15 weight percent.

8. The process as set forth in claim 1 wherein said metal is recovered from a cationic species, and the pH of said polymeric chelating agent stream carrying said metal is greater than 0 to about 7.

9. The process as set forth in claim 8 wherein the pH of said polymeric chelating agent stream carrying said metal is greater than 0 to about 5.

10. The process as set forth in claim 1 wherein said metal is recovered from an anionic species, and the pH of said polymeric chelating agent stream carrying said metal is about 7 to about 14.

11. The process as set forth in claim 10 wherein the pH of said polymeric chelating agent stream carrying said metal is about 9 to about 12.

12. A process for the recovery of at least one metal ion or complex species from the affinity adsorbent/polymeric chelating agent stream of the affinity dialysis system comprising the steps of:
    circulating said affinity adsorbent/polymeric chelating agent stream through the electrolytic recovery cell, said polymeric chelating agent being loaded with metal ions or complexes of said species to be recovered, said species selected from the group consisting of Cr, $CrO_4^{2-}$, Pb, Ir, Ni, Cu, Zr, Ru, Pt, Pd, Ag, cd, Sn, $[Ni(CN)_5]^{3-}$, $Na_2Sn(OH)_6$, and $K_2Sn(OH)_6$;
    reducing said metal ions or complexes from said polymeric chelating agent by application of voltage and current through said stream of loaded polymeric chelating agent;
    depositing said metal species from said stream at the cathode of said electrolytic recovery cell such that a bulk amount of said species is recovered; and
    recycling said affinity adsorbent/polymeric chelating agent stream, in a lean state, to the extraction stage of said affinity dialysis system.

13. The process as set forth in claim 12 wherein said polymeric chelating agent is characterized by a selectivity for said at least one metal species over at least one other metal species.

14. The process as set forth in claim 13 wherein said polymeric chelating agent is selected from the group consisting of sulfonated polyolefins, polyacrylic acid based compounds, polyethylenimine, hydroxyethylated polyethylenimine, polyimino acetic acid, polyimino diacetic acid, polythiourea, poly(2-acrylamide-2-methyl-1-propanesulfonic acid), poly(1,1-dimethyl-3,5-dimethylenepiperidinium chloride), water soluble polymers with Schiff base chelates attached, and water soluble polymers with hydroxy quinolines attached.

15. The process as set forth in claim 14 wherein said polymeric chelating agent is a polyethylenimine having a weight average molecular weight of about 2,000 or greater.

16. The process as set forth in claim 14 wherein said polymeric chelating agent is a hydroxyethylated polyethylenimine having a weight average molecular weight of about 2,000 or greater.

17. The process as set forth in claim 12 wherein said polymeric chelating agent stream has a polymer concentration of about 0.5 weight percett to about 25.0 weight percent.

18. The process as set forth in claim 17 wherein said polymeric chelating agent stream has a polymer concentration of about 10 weight percent to about 15 weight percent.

19. The process as set forth in claim 12 wherein said metal is recovered from a cationic species, and the pH of said polymeric chelating agent stream carrying said metal is greater than 0 to about 7.

20. The process as set forth in claim 19 wherein the pH of said polymeric chelating stream carrying said metal is greater than 0 to about 5.

21. The process as set forth in claim 12 wherein said metal is recovered from an anionic species, and the pH of said polymeric chelating agent stream carrying said metal is about 7 to about 14.

22. The process as set forth in claim 21 wherein the pH of said polymeric chelating agent stream carrying said metal is about 9 to about 12.

* * * * *